US008244225B2

(12) United States Patent
Scheffer et al.

(10) Patent No.: US 8,244,225 B2
(45) Date of Patent: Aug. 14, 2012

(54) INFORMATION DISTRIBUTION SYSTEM AND METHOD FOR A MOBILE NETWORK

(75) Inventors: Francois Petrus Scheffer, Pretoria (ZA); Ignatius Marthinus Rademeyer, Pretoria (ZA); Riana Smit, Pretoria (ZA); Theodor Louis Ferdinand Danzfuss, Pretoria (ZA)

(73) Assignee: Afrigis (Pty) Ltd., Pretoria (ZA)

( * ) Notice: Subject to any disclaimer, the term of this patent is extended or adjusted under 35 U.S.C. 154(b) by 627 days.

(21) Appl. No.: 12/301,921

(22) PCT Filed: May 22, 2007

(86) PCT No.: PCT/IB2007/051930
§ 371 (c)(1),
(2), (4) Date: Feb. 23, 2009

(87) PCT Pub. No.: WO2007/135648
PCT Pub. Date: Nov. 29, 2007

(65) Prior Publication Data
US 2010/0234002 A1   Sep. 16, 2010

(30) Foreign Application Priority Data

May 22, 2006  (ZA) .............................. 2006/04151

(51) Int. Cl.
*H04M 11/00* (2006.01)
(52) U.S. Cl. ............... 455/414.1; 455/412.1; 455/550.1; 455/418; 705/14
(58) Field of Classification Search ............... 455/414.1, 455/412.1, 550.1, 418; 705/14
See application file for complete search history.

(56) References Cited

U.S. PATENT DOCUMENTS

| | | | |
|---|---|---|---|
| 2001/0042132 A1 | 11/2001 | Mayadas | |
| 2002/0035605 A1* | 3/2002 | McDowell et al. | 709/206 |
| 2002/0095333 A1* | 7/2002 | Jokinen et al. | 705/14 |
| 2004/0192272 A1 | 9/2004 | Seo | |
| 2006/0172697 A1* | 8/2006 | Gallego et al. | 455/3.01 |
| 2006/0184421 A1* | 8/2006 | Lipsky et al. | 705/14 |

(Continued)

FOREIGN PATENT DOCUMENTS

EP   2 077 544 A1   7/2009
(Continued)

OTHER PUBLICATIONS

PCT International Preliminary Report on Patentability dated Oct. 7, 2008 for International Application No. PCT/IB2007/051930.

(Continued)

*Primary Examiner* — Danh Le
(74) *Attorney, Agent, or Firm* — Nixon Peabody, LLP; Jeffrey L. Costellia

(57) ABSTRACT

A method of and system for distributing information forming part of an information campaign to a user's mobile device in a mobile communication network are provided. The method comprises receiving campaign message information defining campaign messages to be distributed on behalf of an information provider to a mobile device. A campaign message request associated with a mobile device is received by the system, with the campaign message being generated by embedded architecture content forming part of an application program of a mobile device service provider. The system associates the campaign request with target profile information defined by the information provider in order to select a suitable campaign message for distribution and distributes the selected campaign message to the service provider or mobile device, in response to the received campaign request.

31 Claims, 12 Drawing Sheets

U.S. PATENT DOCUMENTS

| | | | |
|---|---|---|---|
| 2006/0217110 A1* | 9/2006 | Othmer | 455/414.1 |
| 2007/0224979 A1* | 9/2007 | O'Neal et al. | 455/417 |
| 2007/0270163 A1* | 11/2007 | Anupam et al. | 455/456.1 |
| 2008/0058015 A1* | 3/2008 | Boussoukaia et al. | 455/558 |

FOREIGN PATENT DOCUMENTS

| | | |
|---|---|---|
| RU | 2 192 049 C1 | 12/2001 |
| RU | 2003 106 832 | 1/2005 |
| WO | 02/086669 A3 | 10/2002 |
| WO | WO 02/086669 A2 | 10/2002 |

OTHER PUBLICATIONS

PCT International Search Report dated Oct. 25, 2008 for International Application No. PCT/IB2007/051930.

Office Action for Russian Application No. 2008 150 625 issued Mar. 16, 2011 (with English Translation).

Russian Office Action (Application No. 2008 150 625) mailed Oct. 18, 2011, with English translation.

* cited by examiner

INFORMATION DISTRIBUTION SYSTEM AND METHOD FOR A MOBILE NETWORK

BACKGROUND OF THE INVENTION

THIS invention relates to an information distribution system and method for use in mobile communication networks. In particular, the invention relates to a campaign message distribution system and method, for example, for distributing advertising content to users of mobile devices through applications of mobile device service providers.

Various systems and methods are known to distribute advertising content to mobile devices. However, many of these systems distribute adverts randomly to mobile device users. The current systems also do not track, in response to distributed adverts, feedback or responses received from users. In cases where user profiles are available, the user profiles are not updated and the user profile information may become outdated after a period of time. This has been identified as potential drawbacks of the current systems, in particular as feedback information may enable a more direct, targeted way of information distribution and advertising.

It is an object to provide an alternate information distribution system and method.

SUMMARY OF THE INVENTION

According to the invention there is provided a system for distributing information forming part of an information campaign to a user's mobile device in a mobile communication network, the system including:
- a campaign message capturing module to capture information defining campaign messages to be distributed on behalf of an information provider to a mobile device;
- a communication module to
  - receive a campaign message request associated with a mobile device, the campaign message generated by embedded architecture content forming part of an application program of a mobile device service provider, and
  - distribute a selected campaign message to the mobile device or mobile device service provider, in response to the received campaign request; and
- a distribution management module to associate the campaign request with target profile information defined by the information provider in order to select a suitable campaign message for distribution by the communication module.

The campaign message request may be received from a mobile device on which the application program of a mobile device service provider has been downloaded or preloaded.

The campaign message request may be generated on the activation or use of the application program of the service provider on the mobile device.

Alternatively, the campaign message request may be received from the mobile device service provider.

The campaign message request may comprise a unique identifier to identify the mobile device user. For example, the unique identifier may include a MSISDN number or an application program user name for the mobile device user.

The campaign message request may include profile data associated with the mobile device user, the profile data being compared to the target profile information by the distribution management module to select a suitable campaign message for distribution to the mobile device or mobile device service provider.

The communication module may further be configured to receive a user response message from the mobile device or service provider, in response to the distributed campaign message.

Preferably, the system includes a monitoring module to monitor information received from the service provider or the mobile device in response to the distributed campaign message.

The system may further include a profiling module to store the profile data received and to update profile data associated with the user of the mobile device, in response to the received user response message.

The user response message may include a confirmation message to indicate that the campaign message was delivered to or received by the mobile device. Alternatively or in addition, the response message may identify a further action to be taken in response to the campaign message.

The communication module may further provide the service provider with the campaign architecture content to be embedded in the service provider application program.

Optionally, the system may include a registration module to capture information provider data and mobile device service provider data.

In one example embodiment, the distribution management module may select a number of suitable campaign messages for distribution by the communication module, and the system may further comprise a random distribution module to manage a bidding process to select a campaign message for distribution from the number of suitable campaign messages.

The random distribution module may select the campaign message from the number of suitable campaign messages based on a priority assigned to the campaign messages.

Preferably, the priority assigned to the campaign messages may be associated with a monetary amount information providers associated with the number of suitable campaign messages are willing to pay for each campaign message.

Further according to the invention there is provided a method of distributing information forming part of an information campaign to a user's mobile device in a mobile communication network, the method including:
- receiving campaign message information defining campaign messages to be distributed on behalf of an information provider to a mobile device;
- receiving a campaign message request associated with a mobile device, the campaign message generated by embedded architecture content forming part of an application program of a mobile device service provider;
- associating the campaign request with target profile information defined by the information provider in order to select a suitable campaign message for distribution; and
- distributing the selected campaign message to the service provider or mobile device, in response to the received campaign request.

The campaign message request may be received from a mobile device on which the application program of a mobile device service provider has been downloaded or preloaded.

Alternatively, the campaign message request may be received from the mobile device service provider.

The campaign message request may be generated on the activation or use of the application program of the service provider on the mobile device.

The campaign message request may comprise a unique identifier to identify the mobile device user. For example, the unique identifier may include a MSISDN number or an application program user name for the mobile device user.

The campaign message request may include profile data associated with the mobile device user. The step of associating the campaign request with target profile information in order to select a suitable campaign message for distribution to the mobile device may comprise comparing the profile data to the target profile information in order to select a suitable campaign message for distribution to the mobile device.

Preferably the method may further comprise receiving a user response message from the mobile device or service provider, in response to the distributed campaign message.

The method may further comprise storing profile data received and updating profile data associated with the user of the mobile device, in response to the received user response message.

The method may further comprise providing the service provider with the campaign architecture content to be embedded in the service provider application program.

The user response message may include a confirmation message to indicate that the campaign message was delivered or received by the mobile device user. Alternatively or in addition, the response message may identify a further action to be taken in response to the campaign message.

Optionally, the method may include receiving information provider registration data and mobile device service provider registration data;

BRIEF DESCRIPTION OF THE DRAWINGS

FIGS. 4 and 5 show exemplary embodiments of registration screens for the information providers and mobile device service providers;

DESCRIPTION OF PREFERRED EMBODIMENTS

Figure 1:
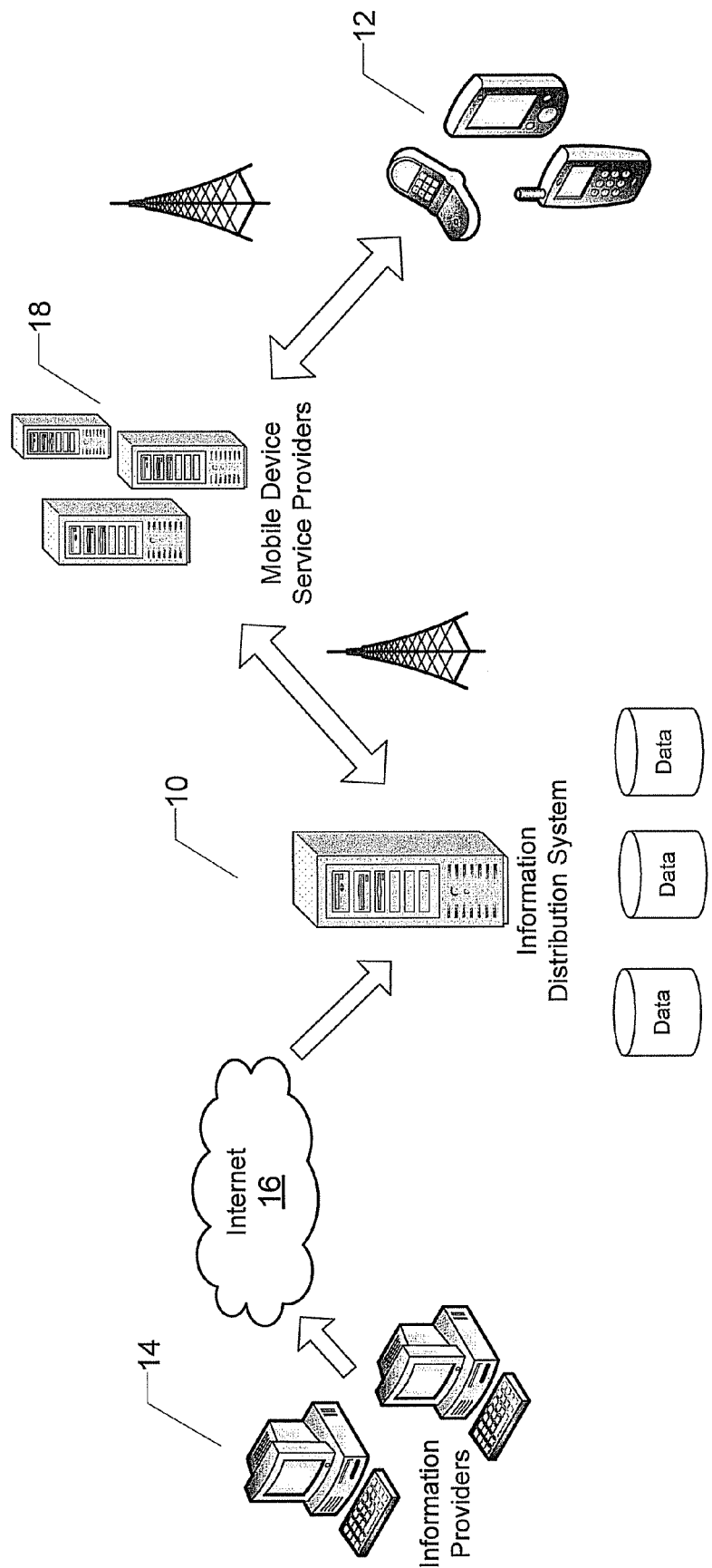
FIG. 1 is a schematic diagram illustrating an information distribution system according to the present invention, interacting with information providers and mobile device service providers.

An information distribution system 10, as used in a mobile communication environment, is shown in FIG. 1. In one example embodiment, the information distribution system 10 may be used for the distribution of campaign messages to users of various mobile devices 12. The campaign message may, for example, form part of an information campaign.

For example, the information distribution system 10 may be used as an advertisement distribution system allowing the selective and dynamic distribution of tailored, individual messages to users of mobile devices 12. Alternatively, the information distribution system 10 may be used for the distribution of messages from other information campaigns, such as weather, traffic or news reports.

Apart from distributing individual messages, the information distribution system 10 may measure responses received from users of the mobile devices 12, in response to the distributed campaign messages. These measured responses may be used to update the records of the information distribution system 10, thereby to determine the possible future distribution of similar or different campaign messages to the mobile devices 12 of users.

It will be appreciated that the mobile devices 12 may be any type of mobile communication device, such as a mobile phone, a personal digital assistant (PDA) with communication functionality or a smart phone.

The information distribution system 10 interacts with information providers 14 to receive and capture campaign messages for various information campaigns of the information providers 14, and further interacts and communicates with mobile device service providers 18 to distribute the campaign messages of the information providers 14.

Information providers 14 are recognized individuals or companies who have products or services to sell, or who have information to distribute. Information providers 14 may, for example, be advertisers or news agencies, which interact, in one example embodiment, via the Internet 16 with the information distribution system 10. Alternatively, information campaigns may be loaded directly onto the information distribution system 10 by an advertising agency acting on behalf of the information provider 14.

A campaign message is the validated display of an information campaign message on a user's mobile device 12 or handset. A campaign message is distributed to the user's mobile device 12 by making use of an application program provided by a mobile device service provider 18.

Each information campaign may have various related campaign messages that can be distributed to user's mobile devices at different times of the day.

Figure 2A:
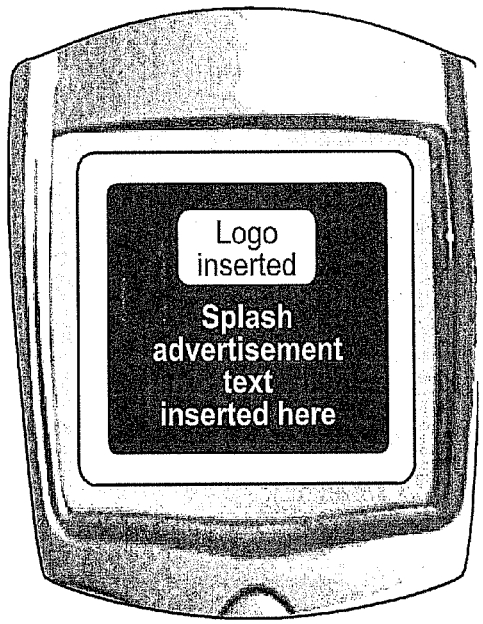
FIGS. 2A to 2D show example embodiments of mobile device display screens with campaign messages displayed on each of the display screens, in accordance with the invention.
Figure 2B:
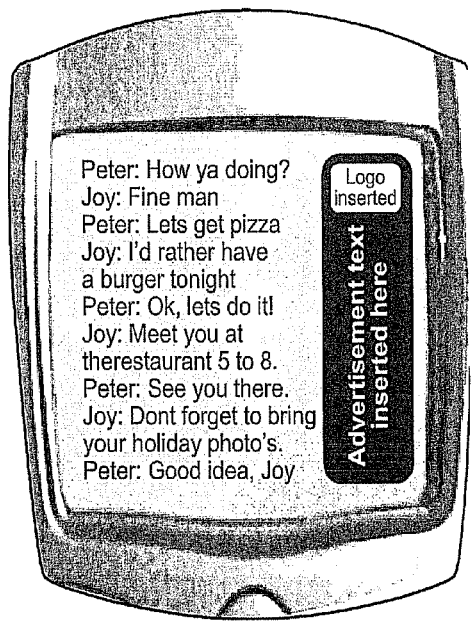
Figure 2C:
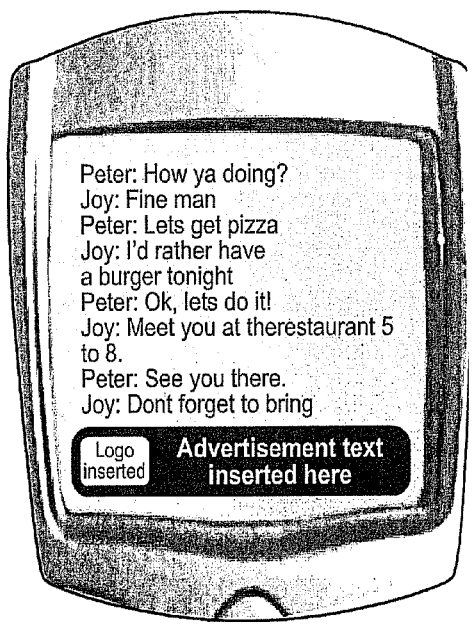
Figure 2D:

Campaign messages may be displayed on a mobile device 12 of a user as splash screens, top and bottom horizontal scrolling text, injected text inside an instant messaging application, sidebars and scrolling side bars. FIGS. 2A to 2D show example embodiments of mobile device display screens with a campaign message displayed as a splash screen (FIG. 2A) and at the side, bottom and top of the display screen (FIG. 2B to 2D). It will be appreciated that the campaign messages may be presented anywhere and in any format on the display of the mobile device. It will further be appreciated that a campaign messages may consist of text only or text and image/video graphics and/or audio.

Typically, the information providers 14 first register with the information distribution system 10 as information providers 14. The registration process may include a verification process, which may be a manual process to verify the validity of the information provided by the information providers 14.

After an information provider 14 has registered with the information distribution system 10, the information defining an information campaign is captured. For example, an advertising company may capture advertisements for a marketing campaign of a new product. Another example is where a news agency captures weather, traffic or news flash data for distribution to particular mobile device users 12. It will be appreciated that the capturing of information may be an automated process after the registration process, especially in applications where information has to be updated regularly, such as news or traffic flashes.

The information distribution system 10 further allows for the information providers 14 to define an appropriate target audience by creating a target profile for each of its information campaigns and associated campaign messages. Each information provider 14 accordingly selects profiling characteristics that best resemble its target audience. In turn, this information is used by the information distribution system 10 to select the appropriate information campaign and/or campaign message and to distribute the campaign messages, through the mobile device service providers' application programs, to the mobile devices 12 of users.

The information distribution system 10 also provides a monitoring functionality for the campaign messages distributed for each information campaign. The monitoring functionality confirms the delivery of each campaign message to the information provider 14. This ensures that the information provider 14 is guaranteed the delivery of each campaign message that is distributed and for which the information provider 14 pays. The monitoring functionality may also be used to influence the distribution of campaign messages to be sent by monitoring data received which relates to the profile of the mobile device user.

For example, the information distribution system 10 allows a company selling teenage apparel to primarily target teenagers in the correct age group, thereby ensuring that the money spent on advertising is spent on the preferred target group and not wasting money on an unsuitable group. The information distribution system 10 may in certain circumstances also associate a mobile user with a specific geographic area using either (e.g., context specific) textual input from a user with regard to their location or using the inherent positioning capability of the communication network used. For example, by parsing the textual input received from a mobile device user, the information distribution system 10 may scan and monitor text that the user sends via the application program of the service provider 18 for any specified keywords or phrases. This feature provides the information provider 14 with an even better target group selection.

Some of these features will be described in more detail below.

When creating a specific information campaign, such as an advertising campaign, the information provider 14 may choose to limit the campaign to a particular number of adverts. The information provider 14 may further select a start date and an end date for a campaign, the time of day the campaign messages should be distributed to mobile users, and as mentioned, the profile of the target group of users to which the campaign messages should be distributed.

In addition, the information provider 14 may specify the amount to be paid per campaign message distributed to the display of a user's mobile device 12, as well as the amount of money to be spent on the campaign per day, and the total amount of money to be spent over the life of the campaign. The pricing for distributing information providers' campaign messages may be determined during a bidding process, and it is therefore important that the information provider 14 specifies, when a bidding system is used, a maximum bid price per campaign message to be distributed.

Typically, the cost of a campaign message increases with the frequency and time slot availability for campaign messages. For example, during periods when time slots for campaign messages are limited, an information provider 14 will have to pay more to distribute its campaign messages. This allows flexibility in the marketing process and the ability to find out exactly which campaign messages have the biggest impact and success rates, in a cost-effective manner.

Once the information campaign is registered, verified and captured, the information distribution system 10 associates and links the information campaign and campaign messages to the information provider 14 and activates the necessary modules (described in more detail below) to process profiling data, campaign requests, monitoring data, billing data and logging data.

As mentioned, the information distribution system 10 is also in communication with the mobile device service providers 18. As will be described in more detail below, the service providers 18 provide the information distribution system 10 with selected user profile information, and also requests the distribution of campaign messages to the client's mobile device 12. A request for the distribution of a campaign message is usually generated on the activation of or during the use of the application program of a particular mobile device service provider on the mobile device 12 of a user.

The communication between the information distribution system 10 and service provider 18, as well as user mobile devices 12 may be through the cellular network, Mobile Internet, SMS, USSD, MMS, GPRS, UMTS, DVB-H, MediaFLO or any other mobile wireless connection, depending on the different applications and equipment used.

In turn, the information distribution system 10 distributes the campaign messages to the mobile device 12 of a user. This is accomplished by the service providers 18 which receive campaign architecture content from the information distribution system 10 for integration into their consumer application programs. The campaign architecture content is configured to allow for the request and delivery of a campaign message, either directly to the user's mobile device, or through the service provider 18. Accordingly, the campaign messages are delivered to the mobile devices of users through the information distribution system's application program (i.e. the campaign architecture content) embedded in the service provider application program or a separate SMS, MMS, WAP push or related bearer technology.

Mobile device service providers 18 are typically providers of mobile device customer services through the use of application programs that may have to be downloaded onto the mobile device 12 of the user. Alternatively, these application programs may be preloaded on mobile devices prior to the sale (e.g., after manufacture) of such mobile devices. Examples of application programs are instant messaging (IM) applications (e.g. chat applications), games and front end JAVA applications. In some instances, the service providers 18 may be mobile communication companies, such as Vodacom, MTN or Cell-C, in the South African context.

Typically, a service provider 18 would also first register with and be certified by the information distribution system 10. The registration and certification of the service providers 18 are necessary to ensure a level of quality of supply to the information providers 14. This process is also important as the service provider 18 may receive a percentage of the campaign message charge on every campaign message sent on behalf of the information provider 14, using the mobile device service provider's applications.

A mobile device user may access an Internet website to download an application program of a mobile device service provider 18 onto the user's mobile device 12. Alternatively, a user may send an SMS message to the service provider 18, and as a response, receive the application program. Prior to the download taking place, a potential user may have to register with the service provider 18. This registration process enables the mobile device service provider 18 to capture personal information relating to the user (user profile data), which information is typically used by the information distribution system 10 to match to an information provider 14 information campaign's target profile.

As will be described in more detail below, the effectiveness of the information distribution system 10 is dependant on the quality of mobile user profile data captured by the service provider 18. It also follows that the mobile user profile data captured by the mobile device service provider 18 would be dependant on the quality and accuracy of their registration process of the mobile device 12 users.

Information providers 14 may choose to use specific mobile device service providers 18 for the distribution of their campaign messages. This choice may be based on the user profile data captured by the service providers 18 and the accuracy of that information. In addition, the successful delivery of campaign messages and the accuracy of the statistics and finally the quality of service and its service level and availability may further influence the choice of the information providers 14. Information providers 14 will choose the mobile device service providers 18 based on the description of the service provider and quality of data, as well as positive hit rates when scheduling campaign messages.

The information distribution system 10 audits and validates the above information to ensure quality of distribution. The better the performance of an information campaign through a particular service provider, the more popular it may become, leading to the information providers 14 possibly being willing to pay more for each campaign message to be distributed via the particular service provider 18.

The information distribution system 10 allows the mobile device service providers 18 a structured entry into a new information distribution channel. By connecting the information providers 14 with the mobile device service providers 18, the existing mobile device applications of the service providers 18 can be leveraged into the field of distributing information. These application programs, as installed on user mobile devices 12, continue functioning as before, but non-intrusive information campaign messages are distributed around the core service.

Figure 3:
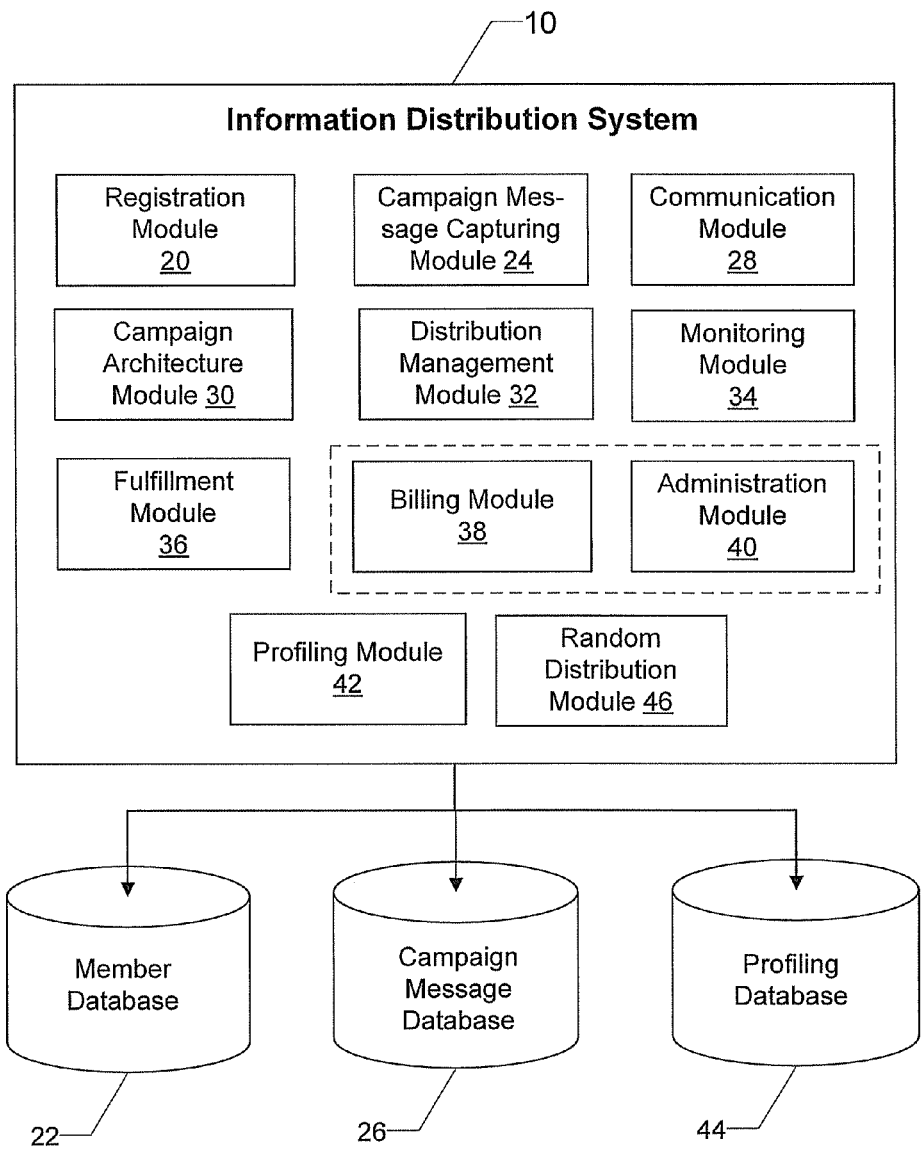
FIG. 3 is a schematic detailed block diagram of the information distribution system of FIG. 1.

The information distribution system 10 includes a number of modules and memory stores or databases that will be described in more detail according to FIG. 3.

A registration module 20, typically a webpage, provides the information providers 14 and service providers 18 with an interface to register as members of the information distribution system 10. The registration module 20 captures all relevant member information.

Figure 4:
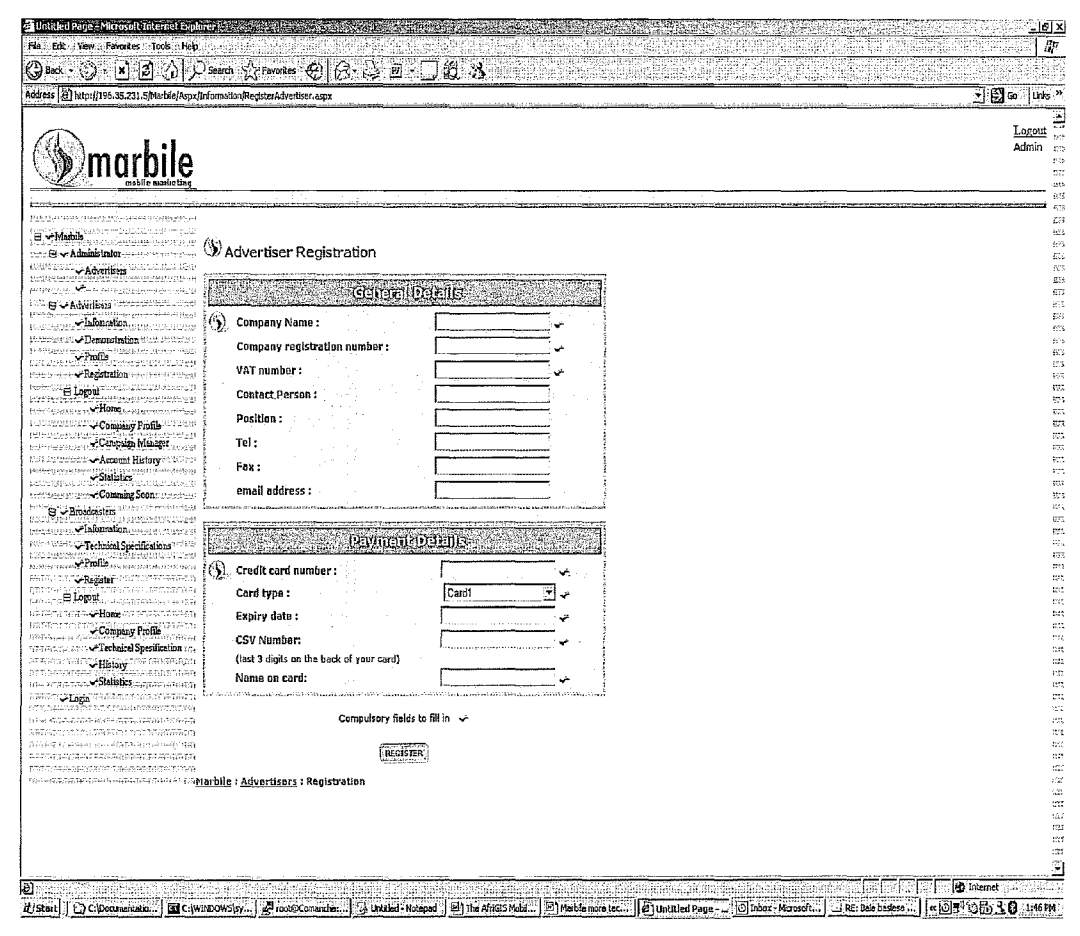
Figure 5:
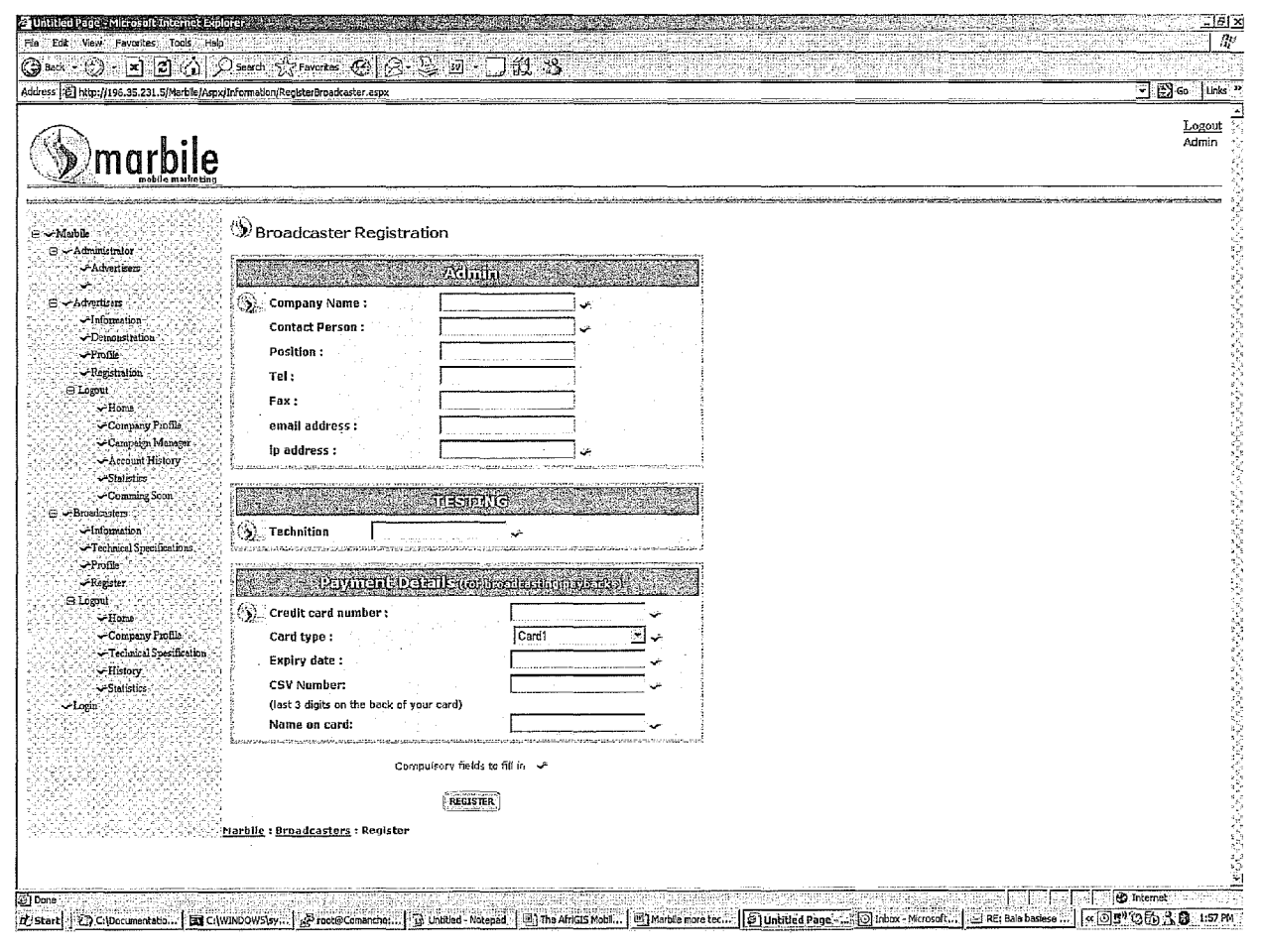
Figure 8:
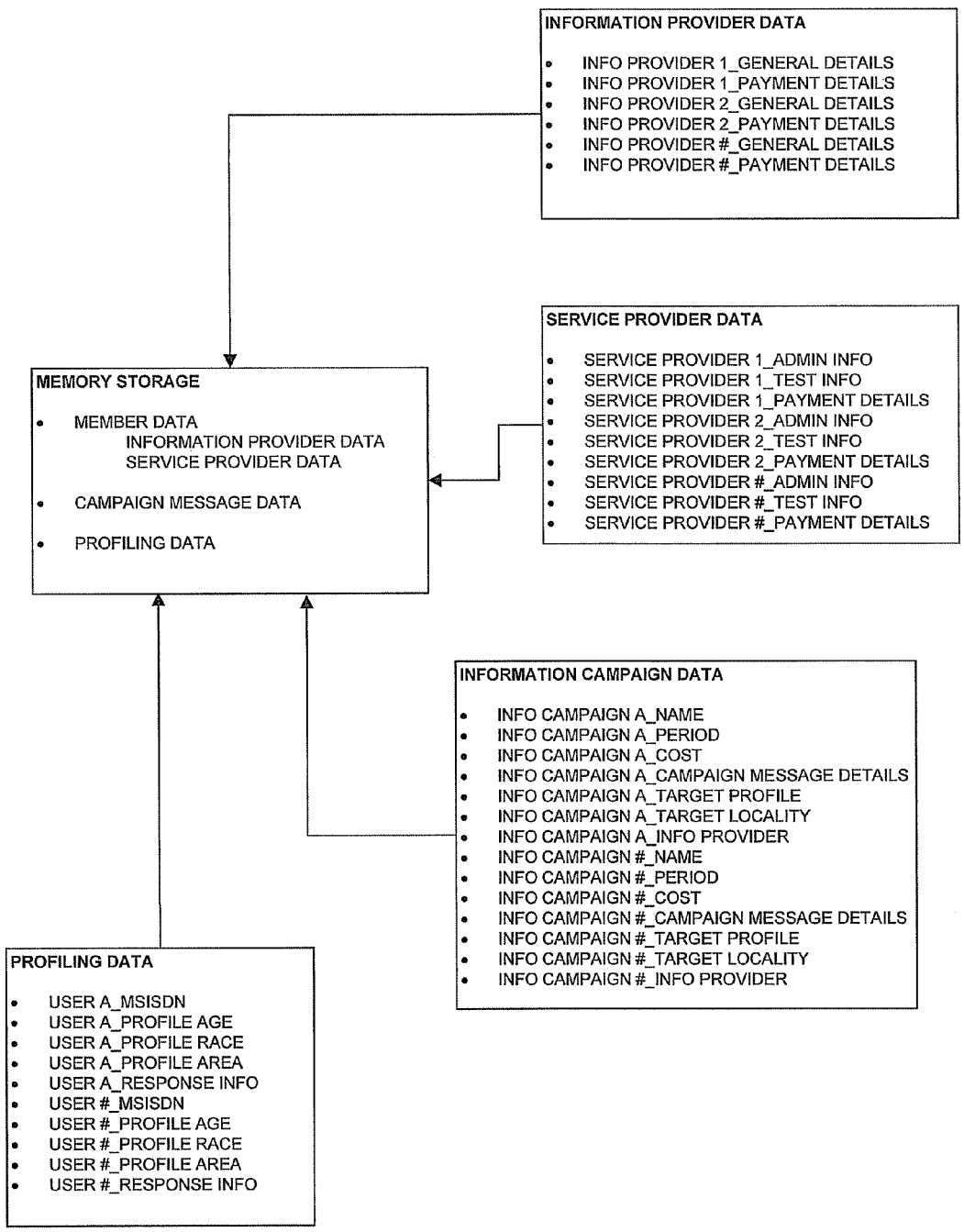
FIG. 8 is a block diagram illustrating an exemplary data architecture of information stored in memory stores according to the present invention.

FIGS. 4 and 5 show exemplary embodiments of registration screens for the information providers 14 and mobile device service providers 18 respectively. FIG. 8 shows an example data architecture for the information captured.

On the information provider registration screen, as shown in FIG. 4, general details and payment details are captured for each information provider.

The general details may include the following:
Company name
Company registration number
VAT number
Contact person
Position
Telephone number
Fax number
E-mail address
The payment details may include the following:
Credit card number
Card type
Expiry date
CSV number
Name on card
Other payment details such as bank account details or Paypal account On the mobile device service provider registration screen, as shown in FIG. 5, administrative information, testing information and payment details are captured for each service provider.

The administrative information may include the following:
Company name
Contact person
Position
Telephone number
Fax number
E-mail address
IP address
The testing information may include the following:
Technician details
The payment details may include the following:
Credit card number
Card type
Expiry date
CSV number
Name on card
Other payment details such as bank account details or Paypal account It will be appreciated that other information (not listed above) may also be captured for both the information provider 14 and service provider 18, depending on the particular application requirements.

The information provider 14 and service provider 18 information is stored in a member database 22 of the information distribution system 10.

Figure 6:
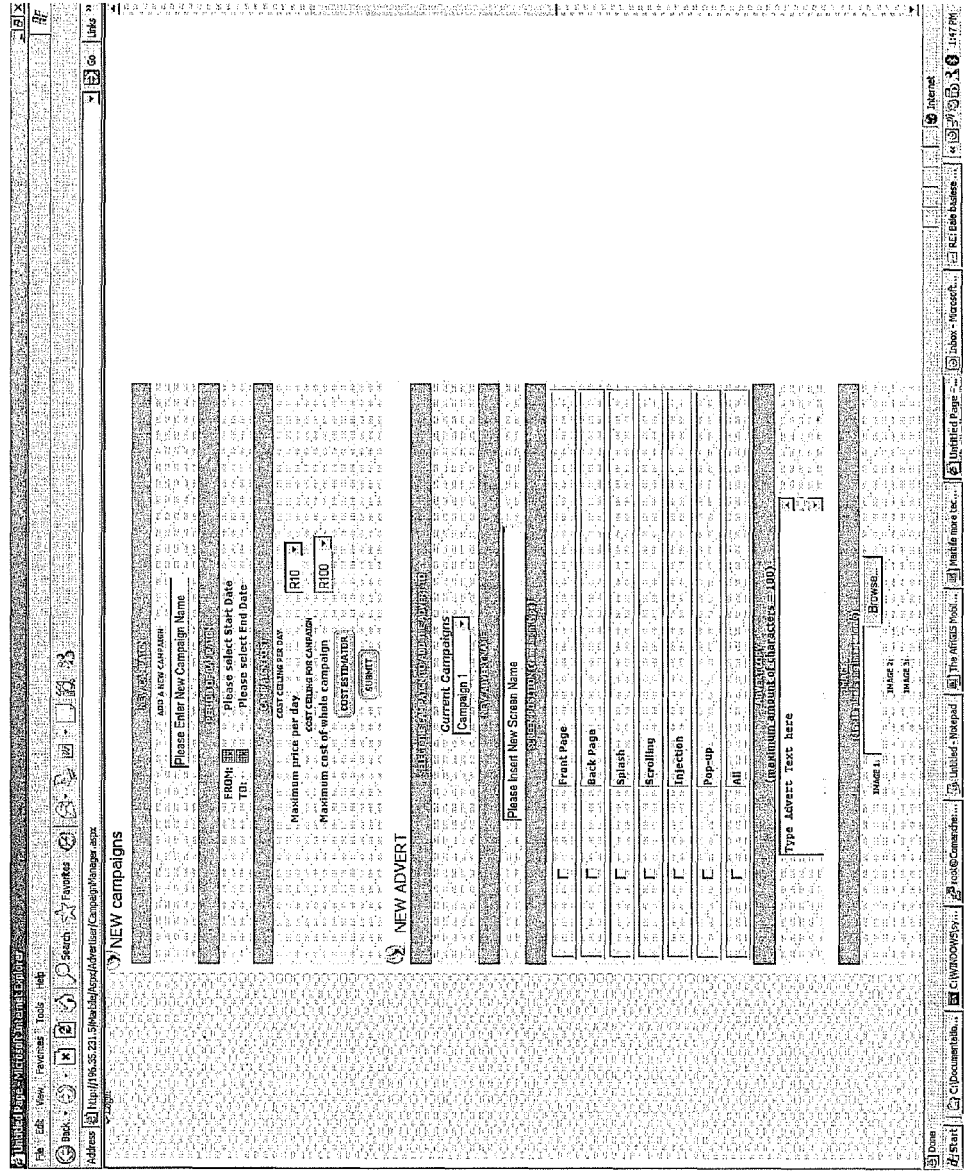
FIGS. 6 and 7 show exemplary embodiments of campaign capturing screens for information providers to capture target market profiles and campaign information.
Figure 7:
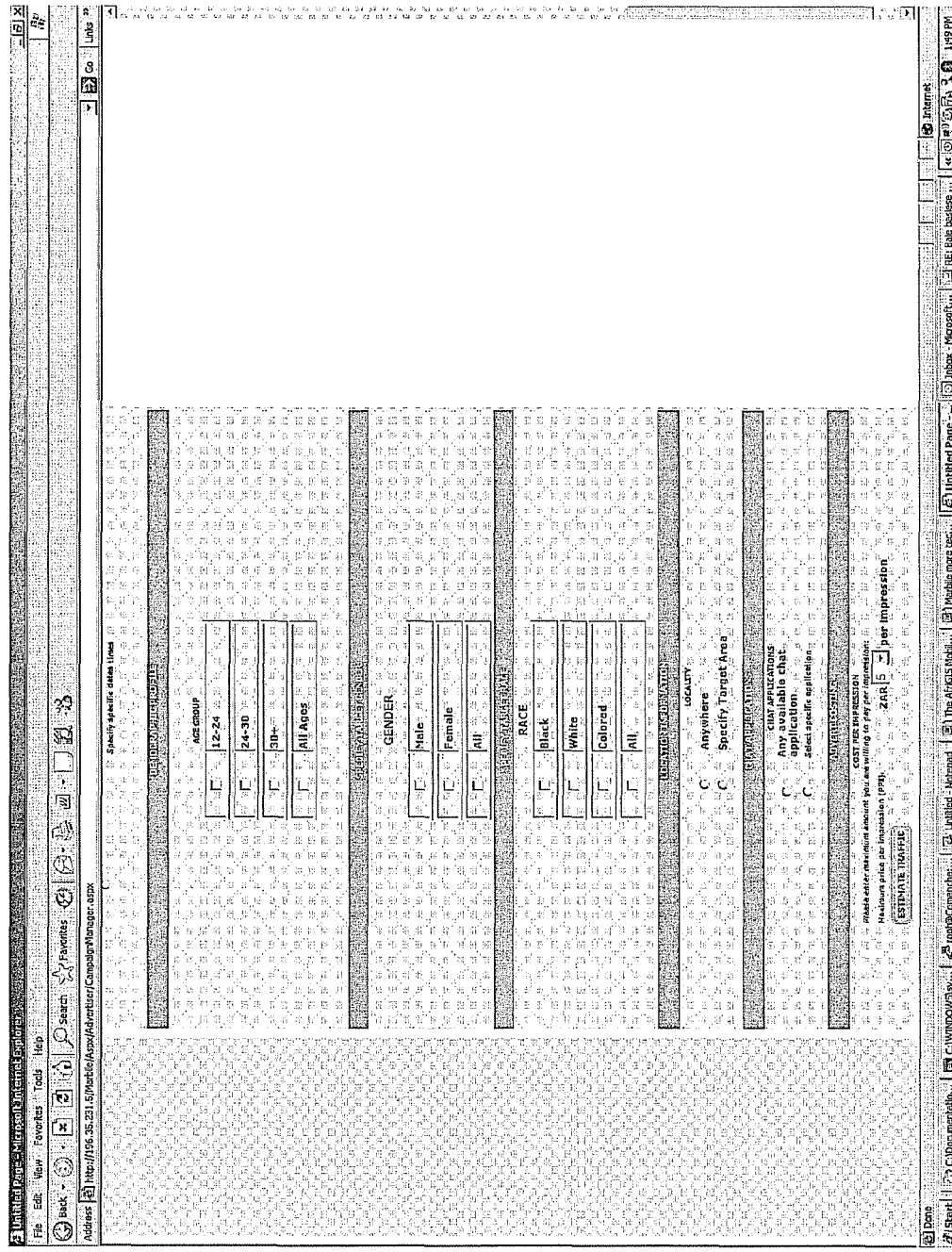

A campaign message capturing module 24 is further used to capture information campaigns with associated campaign messages which the different information providers 14 want to distribute through the information distribution system 18. The information providers 14 or their advertising agency agent is provided with an interface to capture all the campaign information. An example of such an interface is shown in FIGS. 6 and 7, with the information captured also shown in FIG. 8's data architecture depiction.

The interface allows the information providers 14 to specify the following campaign information and information on the profile of the target group:
Information campaign details:
New campaign
  Campaign name
Period of Campaign
  Start date
  End date
Campaign Cost
  Maximum information campaign price per day
  Maximum cost of whole information campaign
Campaign message no. # details:
Campaign Identifier
  Campaign name
New Campaign Message
  Campaign message name
Screen position
  Front page
  Back page
  Splash
  Scrolling
  Injection
  Pop-up
  All Campaign message text
Images
Chat applications
Campaign message no. # budget
   Maximum cost to pay per campaign message
Target group profile information
Age Group
Gender
Race
Locality (e.g., anywhere or specific target area)
Living Standard Measurement (LSM) in South African context It will be appreciated that the information captured for each information campaign and campaign message may differ according to the application and may include information not listed above.

From the above it follows that the information distribution system 10 captures profile variables for each information campaign and/or campaign message, as specified by the information providers 14.

Although not shown above, and as discussed, the information providers 14 may select specific mobile device service providers 18 to deliver their campaign messages. This decision may be based on the type of information to be distributed, the profile of the service provider 18 and the user profiles of the users registered with the service provider 18.

The campaign message capturing module 24 allows for the detail definition of the information campaign, the campaign messages, the design thereof, as well as the target group profile. The campaign message capturing module 24 further allows for the capturing of pricing and payment details. Also, through the campaign message capturing module 24, the information provider 14 may define the budget for each campaign, validity periods for the campaign, as well as authorised delivery periods for the campaign messages (e.g., time of day). The campaign message capturing module 24 may further define possible actions the mobile device user can take on a campaign message, the response on an action and the measurement of fulfillment of these actions.

For example, a campaign message may prompt a mobile device user to send an SMS message to a specified number thereby to order a pizza. The information distribution system 10 will be made aware of such a response message and will contact the pizza outlet thereby to instruct them to arrange for the delivery of the pizza.

Once the campaign messages for each information campaign are loaded by the campaign message capturing module 24, the campaign messages are stored in a campaign message database 26 forming part of the information distribution system 10, according to each campaign message's appropriate classification. The classification of the campaign messages may be according to the campaign's target profile, a combination of the target profile and other factors (described below) or may even be random, for example where not enough information on the user of the mobile device is available.

The information distribution system 10 further includes a communication module 28 to communicate and interact with the service providers 18. The communication module 28 provides each of the service providers 18 with campaign architecture content from a campaign architecture module 30. The campaign architecture content is embedded in the application program of the service provider 18, which may further be downloaded onto a mobile device of a user. For example, if the service provider 18 is an instant messaging (IM) or chat service provider, the campaign architecture content is embedded in the instant messaging application program of the service provider, which is downloaded onto a user's mobile device. As mentioned, such application programs, including the embedded campaign architecture, may alternatively be preloaded on mobile devices.

The communication module 28 is configured to receive a campaign request for a campaign message. In one example embodiment, the campaign request is generated as soon as a user accesses the service provider application on the user's mobile device 12. Alternatively, the campaign request is generated once the first user input is received by the service provider's application program, or during the use of the application program.

Depending on the particular application, this request may be generated from the user's mobile device, by the campaign architecture content embedded in the application program stored on the mobile device of the user, e.g., a remote application program. Alternatively, the request may be generated by the service provider 18, through the campaign architecture content embedded in the service provider's application (e.g., a local application program) which enables the functionalities of the service providers application programs already downloaded on the various users' mobile devices.

The campaign request contains specification variables, such as a unique mobile device user identification and registered user profile data associated with the mobile device and its user. This information is provided to the information distribution system 10 to enable it to determine the type of campaign message to be distributed to the user. Once the campaign request is received, the registered user profile data of the user of the mobile device is stored in a profiling database 44 (with the unique identification of the mobile device user), for comparison with the target profiles of campaign messages and for possible further update.

In one example embodiment, a pre-existing profiling database may already be maintained by the information service provider 10, which database is updated with the registered user profile data received with each campaign request.

As mentioned, the mobile device user may be identified with a unique identifier, such as the MSISDN of the user's SIM-card. Alternatively, the user may be identified through the username used by the user in the service provider application, e.g. the user's chat name. This unique identifier used to identify the user of a mobile device forms part of the specification variables, the campaign request and is also stored in the profiling database 44.

An example of the data comprising the campaign request is the following:

```
<GetAdvert xmlns="http://www.marbile.co.za/">
    <username>string</username>
    <password>string</password>
    <profile>string</profile>
    <amount>string</amount>
    <agegroup>string</agegroup>
    <gender>string</gender>
    <race>string</race>
    <location>string</location>
    <day>string</day>
    <timeslot>string</timeslot>
</GetAdvert>
```

A distribution management module 32 accesses the specification variables via the communication module 28 and compares the profile data of the user with the target profile data in order to identify an appropriate campaign message. This message is then forwarded to the service provider 18, to be distributed and delivered to the mobile phone screen or audio outlet of the user's mobile device. Alternatively, the appropriate campaign message may be distributed to the user's mobile device directly, through the campaign architecture content embedded in the service provider's application and downloaded on the user's mobile device. The message may be delivered through the cellular network, Mobile Internet, SMS, USSD, MMS, GPRS, UMTS, DVB-H, MediaFLO or any other mobile wireless connection, depending on the service provider application program and other application requirements.

It will be appreciated that a number of appropriate campaign messages may also be identified by comparing the user profile data to target profile data associated with the target profile data of the various information providers. A random distribution module, which is described in more detail below, may in these circumstances rely on the bidding process, mentioned above, or other factors to select the campaign message to be distributed to the mobile device user.

Depending on the application requirements, the campaign architecture content may include a tracking component. The tracking component may either form part of the service provider's local application program or may be stored remotely on the mobile device, through the campaign architecture content embedded in the application program which is stored on the mobile device of the user. The tracking component enables the tracking of any actions the user may perform in response to the campaign message. The tracking component also provides a confirmation message to the information distribution system 10 confirming that the campaign message was delivered to the user's mobile device. This enables the information distribution system 10 to deal with exceptions in terms of communication or device interruptions. The tracking component further provides a response to the campaign message from the user. Any actions tracked by the tracking component are relayed back to the information distribution system 10, and in particular to a monitoring module 34 of the information distribution system 10.

The following is an example of campaign architecture content embedded in the service provider application. A tracking component forms part of this content and requests a further action to be monitored.

```
<GetAdvertResponse xmlns="http://www.marbile.co.za/">
    <GetAdvertResult>
        <Advert>
            <id>string</id>
            <name>string</name>
            <securitytag>string</securitytag>
            <refNumber>string</refNumber>
            <advert>string</advert>
            <agegroup>string</agegroup>
            <race>string</race>
            <gender>string</gender>
            <status>string</status>
            <statusdescription>string</statusdescription>
            <action>string</action>
            <returnpath>string</returnpath>
        </Advert>
    </GetAdvertResult>
</GetAdvertResponse>
```

The monitoring module 34 only flags a campaign message as delivered once it has received the confirmation message from the tracking component. A timeout period for synchronous requests or response messages may be configured on the information distribution system 10, for example a timeout period may be set at 15 seconds. If the timeout period expires, it is considered that the campaign message was not delivered. A retry count parameter may also be set on the information distribution system 10, for example, the retry count may be set at three.

In response to the actions and responses tracked, the monitoring module 34 may either automatically instruct the distribution management module 32 to continue sending campaign messages (e.g., in the case of no response received or in the case of only a confirmation message received). Alternatively, the monitoring module 34 may handle the action as requested from the user in the campaign message sent.

For example, the campaign message, based on the campaign message content and an associated call to action of the campaign message, may prompt the user to type specific words in a chat interface being used (e.g. "buy me a pizza". Alternatively, the user may be prompted to make a call, click on a hyperlink, send a SMS or MMS, access a website or WAP-site or even go to an information provider's outlet to display the campaign message. The campaign message may contain encrypted information that can only be deciphered at the information provider's outlet, for example a barcode SMS to enable entrance to a movie theatre.

Actions by the mobile device user, from a different bearer, based on a campaign message distributed by the information distribution system, may also be tracked by the monitoring module 34. These actions are tracked by using a user identifier, such as the MSISDN of the user, and a unique reference number that is allocated to the campaign message and distributed with it. As the user identifier (such as the MSISDN) is inherent to the user's SIM-card or device serial or IMEI number, the user identifier must always be presented, no matter which mobile device or bearer is used.

For example, in the case where the mobile device user has to leave the service provider application because of limited capabilities on the device or due to the nature of the request to take the action required by the content of the campaign message e.g. to send a SMS. MMS or make a voice or video call, the tracking component cannot monitor the activity anymore. However, provided that the responses from users are registered with and communicated to the monitoring module 34 of the information distribution system 10, the response can be tracked.

Therefore, when the user responds via another bearer or physically respond by presenting him- or herself somewhere, the user identifier (e.g. MSISDN) of the user's SIM card, device serial or IMEI number and the reference number may be sent through to the information distribution system 10, and are received by the monitoring module 34 which links the response to the campaign message sent. The response may be sent via the Internet or other secure networks using a protocol developed for the information distribution system.

If no response message is received, the monitoring module 34 will be unable to initiate any fulfillment action.

A fulfillment module 36 is responsible for taking the appropriate action, in response to the response or action received from the user. This action may be dependent on the campaign message registration details, user profile details and action initiated by the user. For example, the fulfillment may be a physical action, such as the delivery of a pizza where the pizza outlet has to be contacted. Alternatively, the fulfillment may be an electronic action, such as the delivery of a ring tone.

Once fulfillment has taken place, a fulfillment confirmation message is generated by the fulfillment module 36. The fulfillment confirmation may be dependent on the circumstances and application of the system. For example, in certain circumstances a confirmation that a message has been sent will be a fulfillment confirmation, whereas in other circumstances the fulfillment confirmation will be confirmation that the sent message had been received. In response to this fulfillment confirmation received from either an electronic or physical environment, relevant billing and statistics are updated by a billing module 38 and an administration module 40.

The billing module 38 bills the information provider 14 for every campaign message sent and similarly, pays the mobile device service provider a portion of the billed amount whenever the service provider's application program is used. Between the billing module 38 and administration module 40, the maximum campaign amount is monitored, to ensure that it is not exceeded.

The monitoring module 34 also provides a profiling module 42 with information to update user profile information. The profiling module 42 stores profiling information of mobile device users in the profiling database 44 and uses a profiling algorithm to update a user's profile information. The monitoring module 34 keeps track of how many times each campaign message is distributed to each mobile device user, as well as whether the user responds positively or negatively to a campaign message. This information is provided to the profiling module 42, which stores this further information also in the profiling database 44.

As mentioned, each mobile user is identified by a user identification, such as the user's MSISDN, device serial or IMEI number, and each time the user responds negatively to the campaign message, the user's chances of receiving the same type of campaign message again is reduced. Similarly each time a user responds positively to a campaign message, the user's chances of receiving a similar message through any of the service providers 18 registered with the information distribution system 10 is increased. Typically, two campaign messages would be defined as similar when the profiles of the target markets, such as age group and location, are similar.

In circumstances where a user's actions occur asynchronously on a different bearer and responses are received as described above, the feedback is integrated as before into the profiling information.

It will be appreciated that the information distribution system 10 would be able to update its profiling database 44 with information received from the various mobile device users, but also from multiple mobile device service providers. For example, in circumstances where multiple information providers 14 and mobile device service providers 18 are registered with the information distribution system 10, campaign messages will be distributed on behalf of the various information providers 14 through the application programs of the various mobile device service providers 18. This would result in the profiling database 44 for specific mobile device users being built up from user registration data received initially from the various mobile device service providers 18. For example, the information distribution system 10 may receive profiling data for a specific user identified by the MSISDN of the user's mobile device from two or more mobile device service providers. This information is then collated and updated by the profiling module 42 into a detailed user profile for the specific user. Whenever further data relating to the user profile is received from the user's mobile device or from any mobile device service provider 18, e.g., as part of a response, this further data will be used to update the current profile of the particular user.

A random distribution module 46 of the information distribution system 10 executes algorithms and processes to ensure that campaign messages of the different information providers 14 are distributed randomly in a weighted chance statistical process. Weights are typically assigned according to the price of the campaign message, the user profile of previous delivery statistics, execution success and other.

For example, when the mobile device service provider 18 requests a campaign message, the service provider 18 also specifies the target market criteria for the campaign message, such as the location of distribution and age of the particular mobile device user. The distribution management module 32 selects all the campaign messages that would qualify for the specified criteria. An automated bidding process is then managed by the random distribution module 46, in that the amounts the information providers are willing to pay for each campaign message are compared and the highest bid campaign message receives the highest priority. For each campaign message, the random distribution module 46 calculates a percentage of daily allowed campaign messages and factors this in to change the priority of the messages. This is to ensure that all the top bidding campaign messages do not take all the available positions. The random distribution module 46 now uses a standard random function to select one of the top 5 campaign messages in the priority list. The parameters of this algorithm can be changed to ensure optimal performance of the information distribution system.

It will be appreciated that the information distribution system 10 may form part of the architecture of a mobile device service provider 18. For example, in certain circumstances the mobile device service provider 18 may be a cellular company, such as Vodafone, which may incorporate the infrastructure of and services provided by the information distribution system 10.

It will further be appreciated that in circumstances where multiple instances of information distribution systems 10 exist due to capacity constraints or information/service provider requirements, it may be necessary to have a central instance of an information distribution system to which information (e.g., the profiling information of mobile device users, billing information, etc) is replicated from the multiple instances of information distribution systems.

Figure 9:
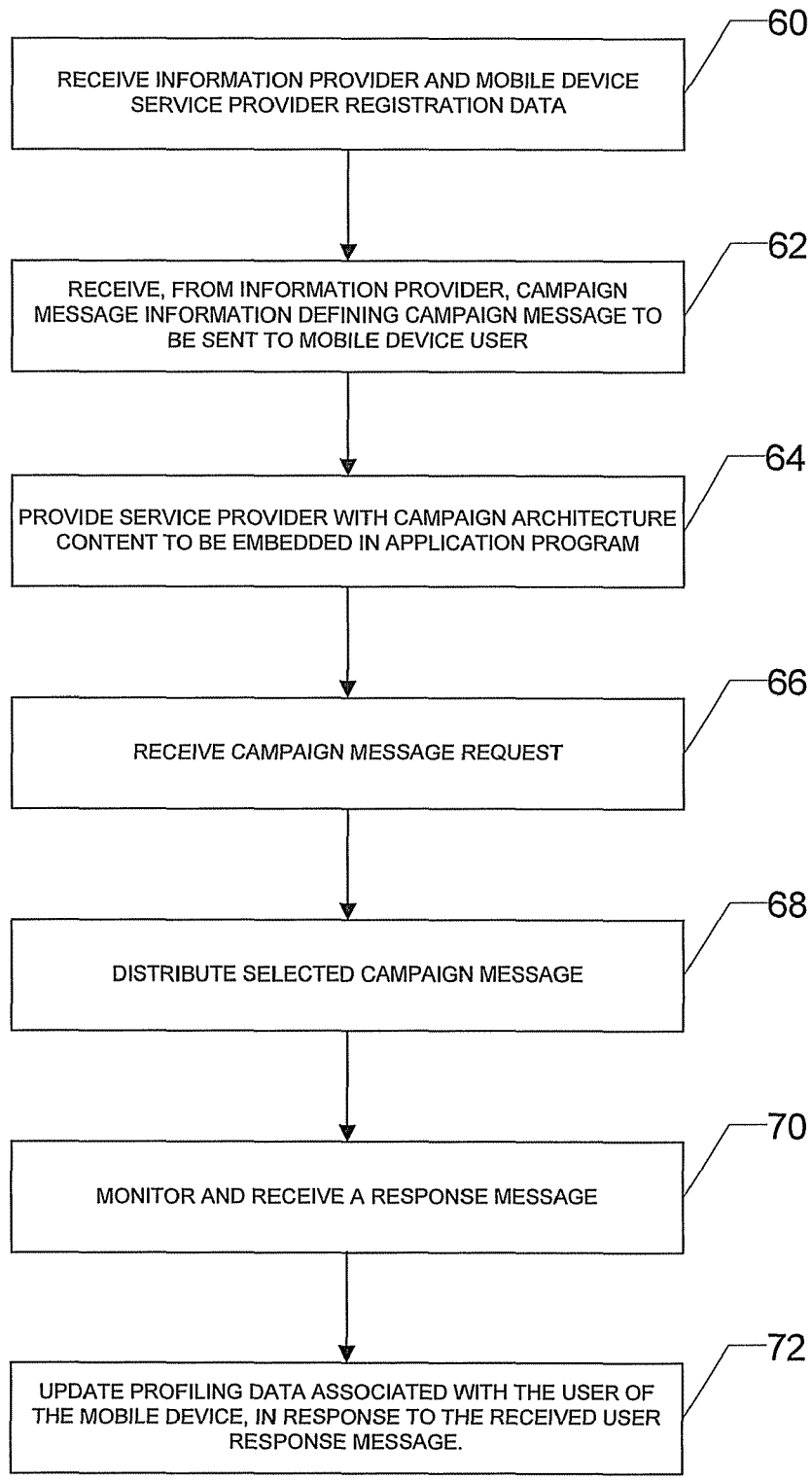
FIG. 9 shows a high level flow diagram of an information distribution method in accordance with the present invention.
Figure 10A:
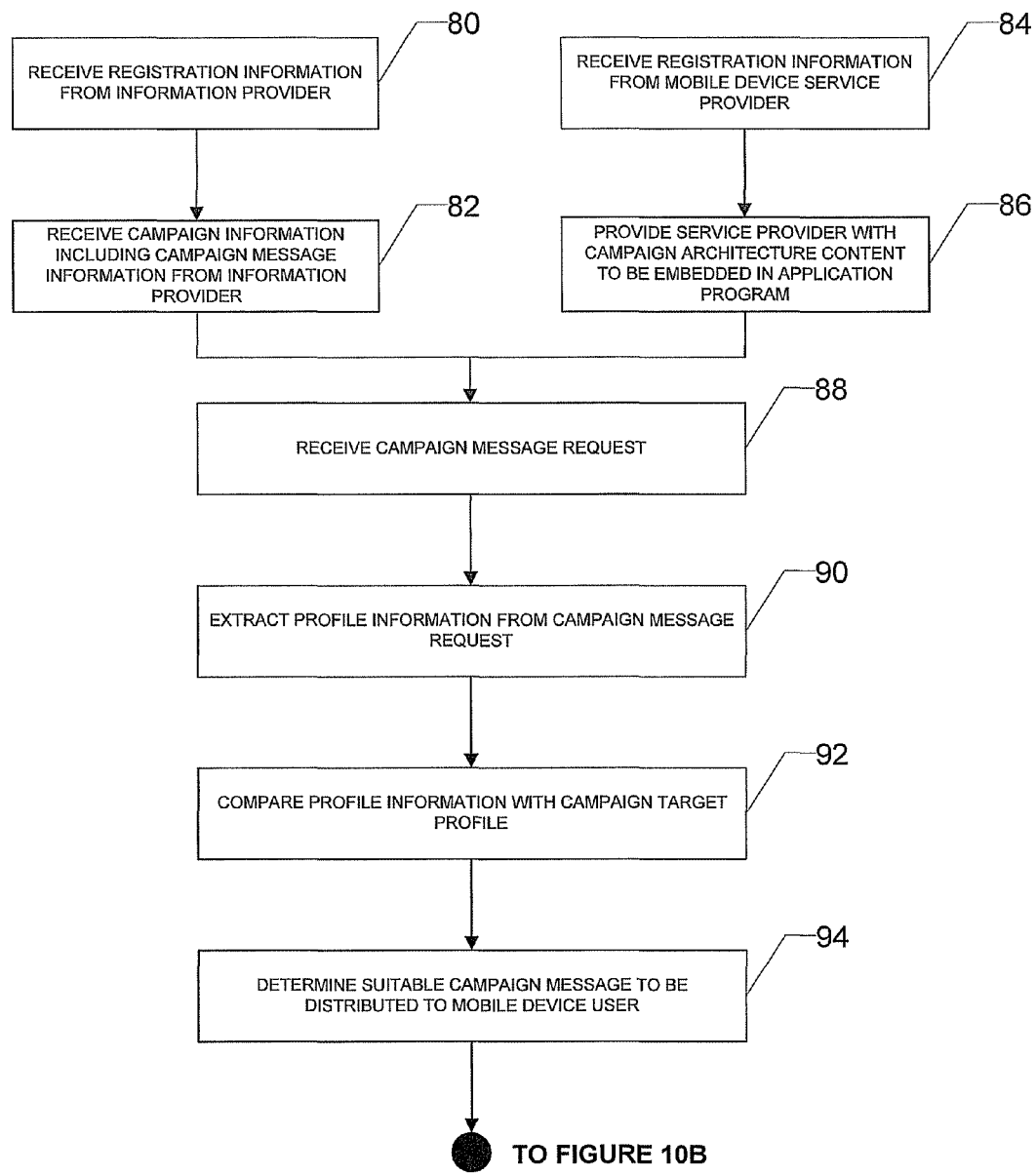
FIGS. 10A and 10B show a detailed flow diagram of the information distribution method of FIG. 8.
Figure 10B:
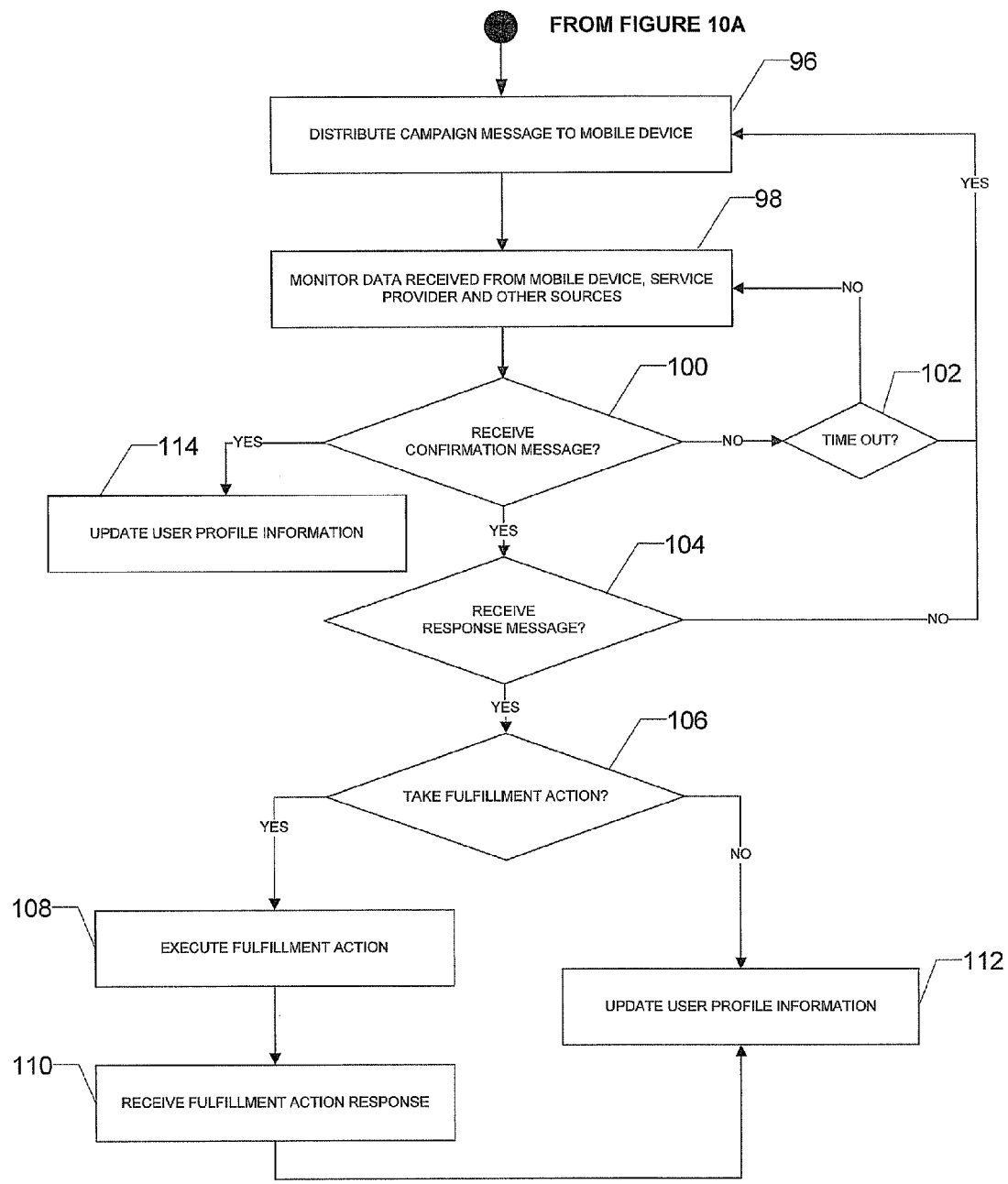

A method of distributing campaign information is now described according to FIG. 9 and FIGS. 10A and 10B. In one example embodiment, the method may be executed by the information distribution system 10 shown in FIG. 1 and described in more detail in accordance with FIG. 3. However, it will be appreciated that the information distribution system 10 may be a subsystem of a mobile device service provider 18.

Turning to the simplified flow diagram of FIG. 9, and in particular operation 60, information provider registration data and mobile device service provider registration data are received and captured by the registration module 20. The campaign message capturing module 24 receives and captures campaign message information in operation 62. As described in detail above, the campaign message information defines campaign messages which are to be distributed on behalf of the information provider 14 to the users of mobile devices 12.

In operation 64, campaign architecture content is provided from the campaign architecture module 30 to the service provider 18. The service provider 18 embeds this content into its application program, which enables the service provider 18 to distribute campaign messages for the information provider 14.

As indicated by operation 66, the communication module 28 may now receive a campaign message request from the service provider 18 directly or, alternatively, directly from the user's mobile device 12. The campaign request provides the information distribution system 10 with sufficient information to select a suitable campaign message. For example and as mentioned above, the request may include user profiling data which is used to select the most appropriate campaign message by comparing the user profiling data to the profiling data stipulated by the information providers.

In response to the campaign request, the distribution management module 32 distributes, in operation 68, the selected campaign message to the user's mobile device. The service provider 18 may incorporate the campaign message in its application and distribute it on to the mobile device of the user.

As shown in operation 70, the monitoring module 34 monitors all information received from the service provider 18, mobile device 14 and other sources and receives, via the communication module 28, a response message. The response message may include a confirmation message and a message indicating that further action is to be taken on the distributed campaign message.

Profiling data of the user to which the campaign message has been distributed is extracted from the response message and is used by the profiling module 42 to update profiling data associated with the user of the mobile device (operation 72).

Turning now to the more detailed flow diagrams shown in FIGS. 10A and 10B, operation 80 shows the registration module 20 receiving registration data from the information provider 14. Similar to operation 62 of FIG. 9, the campaign message capturing module 24 captures and receives campaign message information in operation 82.

In operation 84, the registration process of the mobile device service provider 18 is shown, with the registration module 20 receiving and capturing mobile device service provider data. The distribution management module 32 provides the service provider 18 with campaign architecture content, the content optionally including a tracking component.

This allows the service provider 18 to embed the campaign architecture content in its application programs which are stored locally at the service provider. Application programs with embedded campaign architecture may also be downloaded to user mobile devices, in order for these users to access the services of the service providers enabled by the respective application programs. As described, the campaign architecture content allows the service provider to integrate any campaign messages that have to be sent to users of mobile devices (operation 86) into its applications, to track responses made by the mobile device users and further to send the tracking information back to the information distribution system 10.

On the activation of the service provider's application on the user's mobile device (or alternatively, during use of the service provider's application program or on receipt of an input from the user while accessing the application program), a campaign message request is sent to the information distribution system 10, either via the service provider or directly from the user's mobile device. In operation 88, the communication module 28 receives the campaign message request from the service provider 18. As mentioned, the campaign message may include profile data associated with the user, as well as a user identifier.

The distribution management module 32 extracts the profile data from the campaign message in operation 90. This profile information is compared to stored target profile information (operation 92), in conjunction with the operations of the random distribution module 46, and used to determine, in operation 94, a suitable campaign message to be distributed to the mobile device service provider (operation 96), for further distribution to the mobile device user.

Once the campaign message has been sent to the service provider 18, the monitoring module 34 monitors all information received from the service provider 18, mobile device 12 or other sources (operation 98). As shown in operation 100, the monitoring module 34 checks whether a confirmation message has been received from the service provider 18. If no confirmation message has been received, the monitoring module 34 checks whether the time out period has been exceeded, in operation 102. As long as the time out period has not been exceeded, the monitoring module 34 continues to monitor the information received from the service provider 18 (operation 100). If the time out period has been exceeded, the information distribution system 10 distributes a further message to the service provider 18, for redistribution to the user of the mobile device 12.

In the event that the confirmation message has been received, the monitoring module 34 continues to monitor communications from the service provider 18, mobile device 12 or other sources to obtain a response message (in response to the distributed campaign message) from the service provider 18, as shown in operation 104. The response message would typically indicate whether a fulfillment action is required.

Once a response message is received, it is determined whether a fulfillment action is to be taken (operation 106). In the event that a fulfillment action is detected, the fulfillment module 36 executes the action in operation 108 and the communication module 28 receives a fulfillment action response, in operation 110. If no fulfillment action is detected, or once the fulfillment action response has been received, the profiling module 42 uses the response and fulfillment information to update the user profile information in operation 112.

The profiling module 42 may also update the user profiling information once a confirmation message has been received, as shown in operation 114.

An example of the operation of the information distribution system 10 is where a mobile device user. Sally, activates an application or service from her mobile phone, e.g. Sally starts a chat (IM) application. The chat application, being associated with the information distribution system 10 through the registered mobile device service provider 18, contacts the information distribution system 10 with the profile of the current mobile device user and requests a campaign message.

The information distribution system 10 now selects the relevant time and profile specific campaign message from its database of campaign messages. The information distribution system 10 further confirms that the pricing and budget options of the information provider 14 are in order to deliver the campaign message.

The chat application on Sally's mobile device receives the campaign message and displays it on the mobile device. Once Sally spots the advert, she may take note of the campaign message or may even take an action in response thereto. For example, she may take an action indicated, such as typing "I love pizza" in the chat application.

The chat application now sends a confirmation message back to the information distribution system 10, the confirmation message stipulating that the campaign message was delivered.

Upon receiving the confirmation message the information distribution system 10 adjusts the information provider's statistics and updates the daily budget selected by the information provider, by deducting the relevant fees.

The process may typically be repeated for the current user every 30 seconds, repeated for a certain amount of instances or re-started for every new user.

Figure 11:
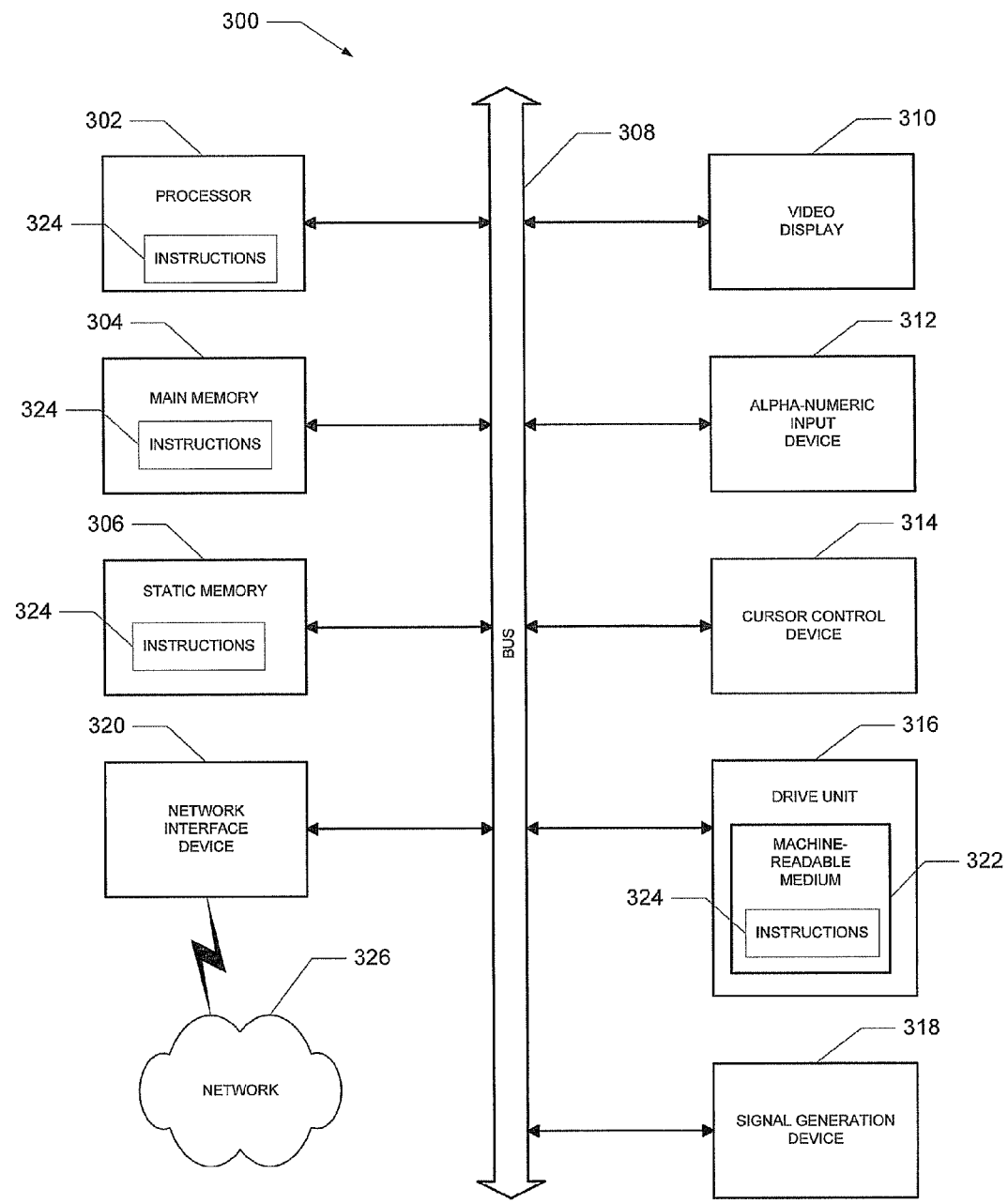
FIG. 11 is a block diagram showing a machine for performing any of the example methods described herein.

FIG. 11 shows a diagrammatic representation of machine in the exemplary form of a computer system 300 within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 300 includes a processor 302 (e.g., a central processing unit (CPU), a graphics processing unit (GPU) or both), a main memory 304 and a static memory 306, which communicate with each other via a bus 308. The computer system 300 may further include a video display unit 310 (e.g., a liquid crystal display (LCD) or a cathode ray tube (CRT)). The computer system 300 also includes an alphanumeric input device 312 (e.g., a keyboard), a user interface (UI) navigation device 314 (e.g., a mouse), a disk drive unit 316, a signal generation device 318 (e.g., a speaker) and a network interface device 320.

The disk drive unit 316 includes a machine-readable medium 322 on which is stored one or more sets of instructions and data structures (e.g., software 324) embodying or utilized by any one or more of the methodologies or functions described herein. The software 324 may also reside, completely or at least partially, within the main memory 304 and/or within the processor 302 during execution thereof by the computer system 300, the main memory 304 and the processor 302 also constituting machine-readable media.

The software 324 may further be transmitted or received over a network 326 via the network interface device 320 utilizing any one of a number of well-known transfer protocols (e.g., HTTP).

While the machine-readable medium 322 is shown in an exemplary embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention, or that is capable of storing, encoding or carrying data structures utilized by or associated with such a set of instructions. The term "machine-readable medium" shall accordingly be taken to include, but not be limited to, solid-state memories, optical and magnetic media, and carrier wave signals. Although an embodiment of the present invention has been described with reference to specific exemplary embodiments, it will be evident that various modifications and changes may be made to these embodiments without departing from the broader spirit and scope of the invention. Accordingly, the specification and drawings are to be regarded in an illustrative rather than a restrictive sense.

The invention claimed is:

1. A system for distributing information forming part of an information campaign to a user's mobile device in a mobile communication network, the system comprising:
   a campaign message capturing module to capture information defining campaign messages to be distributed on behalf of an information provider to a mobile device;
   a communication module to receive a campaign message request associated with a mobile device, the campaign message request generated by embedded architecture content forming part of art application program of a mobile device service provider, the campaign message request being generated on the activation or use of the application program of the service provider on the mobile device, and
   distribute a selected campaign message to the mobile device or mobile device service provider, in response to the received campaign message request; and
   a distribution management module to associate the campaign message request with target profile information defined by the information provider in order to select a suitable campaign message for distribution by the communication module.

2. A system according to claim 1, wherein the campaign message request is received from a mobile device on which the application program of a mobile device service provider has been downloaded or preloaded.

3. A system according to claim 1, wherein the campaign message request is received from the mobile device service provider.

4. A system according to claim 1, wherein the campaign message request includes a unique identifier to identify the mobile device user.

5. A system according to claim 4, wherein the unique identifier is a MSISDN number or an application program user name for the mobile device user.

6. A system according to claim 4, further comprising a monitoring module to monitor information received from the service provider or the mobile device in response to the distributed campaign message.

7. A system according to claim 6, wherein the monitoring module tracks actions of or a user response message from the mobile device user in response to the distributed campaign message from a different bearer through the unique identifier.

8. A system awarding to claim 1, wherein the communication module is configured to receive a user response message from the mobile device or service provider, in response to the distributed campaign message.

9. A system according to claim 8, wherein the user response message identifies a further action to be taken in response to the distributed campaign message.

10. A system according to claim 8, wherein the user response message includes a confirmation message to indicate that the campaign message was delivered to received by the mobile device.

11. A system according to claim 1, wherein the communication module is to provide the service provider with the campaign architecture content to be embedded in the service provider application program.

12. A system according to claim 8, wherein the campaign message request includes profile data associated with the mobile device user, the profile data being compared to the target profile information by the distribution management module to select a suitable campaign message for distribution to the mobile device or mobile device service provider.

13. A system according to claim 12, further comprising a profiling module to store the profiling data received and to update profile data associated with the user of the mobile device, in response to the received user response message.

14. A system according to claim 12, wherein the distribution management module selects a number of suitable campaign messages for distribution by the communication module, and wherein the system further comprises a random distribution module to manage a bidding process to select a campaign message for distribution from the number of suitable campaign messages.

15. A system according to claim 14, wherein the random distribution module selects the campaign message from the number of suitable campaign messages based on a priority assigned to the campaign messages.

16. A system according to claim 15, wherein the priority assigned to the campaign messages is associated with a monetary amount information providers associated with the number of suitable campaign messages are willing to pay for each campaign message.

17. A system according to claim 1, further comprising a registration module to capture information provider data and mobile device service provider data.

18. A method of distributing information forming part of an information campaign to a user's mobile device in a mobile communication network, the method comprising:
receiving campaign message information defining campaign messages to be distributed on behalf of an information provider to a mobile device;
receiving a campaign message request associated with a mobile device, the campaign message request generated by embedded architecture content forming part of an application program of a mobile device service provider and being generated on the activation or use of the application program of the service provider on the mobile device;
associating the campaign message request with target profile information defined by the information provider in order to select a suitable campaign message for distribution; and
distributing the selected campaign message to the service provider or mobile device, in response to the received campaign message request.

19. A method according to claim 18, wherein the campaign message request is received from a mobile device on which the application program of a mobile device service provider has been downloaded or preloaded.

20. A method according to claim 18, wherein the campaign message request is received from the mobile device service provider.

21. A method according to claim 18, wherein the campaign message request includes a unique identifier to identify the mobile device user.

22. A method according to claim 21, wherein the unique identifier is a MSISDN number or an application program user name for the mobile device user.

23. A method according to claim 21, further comprising tracking actions of or information received from the mobile device user in response to the distributed campaign message from a different bearer through the unique identifier.

24. A method according to claim 18, further comprising receiving a user response message from the mobile device or service provider, in response to the distributed campaign message.

25. A method according to claim 24, wherein the response message identifies a further action to be taken in response to the campaign message.

26. A method according to claim 24, wherein the user response message includes a confirmation message to indicate that the campaign message was delivered or received by the mobile device user.

27. A method according to claim 18, wherein the campaign message request includes profile data associated with the mobile device user.

28. A method according to claim 27, further comprising storing profile data received and updating profile data associated with the user of the mobile device, in response to the received user response message.

29. A method according to claim 18, wherein the step of associating the campaign request with target profile information in order to select a suitable campaign message for distribution to the mobile device comprises comparing the profile data to the target profile information in order to select a suitable campaign message for distribution to the mobile device.

30. A method according to claim 18, further comprising receiving information provider registration data and mobile device service provider registration data.

31. A method according to claim 18, further comprising providing the service provider with the campaign architecture content to be embedded in the service provider application program.

* * * * *